US007539001B2

(12) United States Patent
Takeyoshi

(10) Patent No.: US 7,539,001 B2
(45) Date of Patent: May 26, 2009

(54) SURGE DISCHARGING DEVICE

(76) Inventor: Ohara Takeyoshi, 235 Chung-Ho, Box 8-24, Taipei (TW)

( * ) Notice: Subject to any disclaimer, the term of this patent is extended or adjusted under 35 U.S.C. 154(b) by 47 days.

(21) Appl. No.: 11/807,614

(22) Filed: May 31, 2007

(65) Prior Publication Data

US 2008/0297968 A1 Dec. 4, 2008

(51) Int. Cl.
*H02H 7/20* (2006.01)
*H02H 1/00* (2006.01)

(52) U.S. Cl. .................................................... 361/112

(58) Field of Classification Search .................. 361/112
See application file for complete search history.

(56) References Cited

U.S. PATENT DOCUMENTS 4,670,729 A * 6/1987 Oh ............................ 337/262
5,923,519 A * 7/1999 Chang et al. ................ 361/129
2002/0075125 A1* 6/2002 Yang ........................... 338/21

* cited by examiner

*Primary Examiner*—Ronald W Leja

(57) ABSTRACT

A surge discharging device for releasing electric surge due to high voltage so as to avoid destroy of an electric apparatus having the device, the surge discharging device comprises a body having a hollow space; a channel connected between the hollow space and an exterior of the body; two terminals spaced at two sides of the hollow space; front ends of the terminals being exposed in the hollow space and rear ends of the terminals being exposed out of the body. The body includes a first enclosure and a second enclosure. A plurality of connecting bars are extended from the first enclosure; and the second enclosure is formed with a plurality of connecting holes. An inner wall of each of the first enclosure and the second enclosure has a recess; as the first enclosure and the second enclosure are combined, the two recesses are formed as the hollow space.

4 Claims, 12 Drawing Sheets

SURGE DISCHARGING DEVICE

FIELD OF THE INVENTION

The present invention relates to surges, and particularly to a surge discharging device, in that, no varistor is used. Furthermore the surge discharging device has a smaller size and has a standard specification so that it can be used to various electric devices. Furthermore a hollow space and electrodes of the surge discharging device are allowed to be changed within the allowable margin of the specification so as to match the requirements of the applications.

BACKGROUND OF THE INVENTION

For reducing the component size of the electronic device, semiconductors have become the main components for the processors and controller in the electronic devices so as to reduce the size of the electronic devices and the functions of the devices are promoted greatly. However, these kinds of components are weak in the preventing of surge waves generated in the circuit. Thus it is important to prevent the destroy from surge waves in the electronic devices. Generally, there are two conditions which will induce surges in the circuit. One is switching surges due to the switching of the electric power switching. The other is from the nature phenomenon, such as lighting surges due to the thunderbolt to buildings. However all these surges will affect the operation of the electric device indoors, even the device will be destroyed or induce fire accident.

Generally, in electric devices or power system, fuse or fuseless switch are used as short circuit protection for transient high voltage or overload. However the reaction times of generally electric elements are about 2 ms, while the reaction time of the surge is several micro seconds (μs) which are very shorter than the transient reaction time of the electric elements. Thus, the fuse or fuseless switch is not enough for preventing the destroy from surges.

The prior art principle for the surge discharging device is by using a kernel element, varistor. The resistance of the varistor is changeable based on the voltage difference between two ends of the elements. The technologies are disclosed in Taiwan Patent No. M297037. Besides, in Taiwan Patent Publication No. 200623573, at lease one semiconductor field emission over-voltage protection device is disclosed. A semiconductor field emission over-voltage protection device is forwardly connected in parallel or forwardly connected with anti-parity. The protection device is also coupled to a front end of an I/O of a high frequency circuit, or is connected between an input end and a ground end. Above mentioned applications used in the normal voltage. The resistance of the varistor is very high. When the voltage has achieved to a predetermined value, the resistance will decrease rapidly with a react time of about several nanosecond (ns). Thus, when a varistor is used to a surge discharging device, the surge discharging device is connected in parallel to a front end of an electric device. As a result, in normal operation voltage, the surge discharging device is used as in open circuit. When the voltage increases abnormally, it is used as in short circuit for prevent high energy from flowing into the electric device so that the surge has no effect to the electric device.

SUMMARY OF THE INVENTION

Accordingly, the primary object of the present invention is to provide a surge discharging device, in that, no varistor is used. Furthermore the surge discharging device has a smaller size and has a standard specification so that it can be used to various electric devices. Thereby a hollow space and electrodes of the surge discharging device are allowed to be changed within the allowable margin of the specification so as to match the requirements of the applications.

Effect of the present invention is that the manufacturing work is simple and no parallel connected varistor is used. When voltage increases in several nanoseconds abnormally, a hollow space is used to generate charges by discharge electrodes. The charges are drained out from a channel so as to protect the circuit from thunderbolt, electric static charges, and surges.

To achieve above objects, the present invention provides a surge discharging device for releasing electric surge due to high voltage of a circuit so as to avoid destroy of an electric apparatus having the device, the surge discharging device comprising a body having a hollow space; a channel connected between the hollow space and an exterior of the body; two terminals spaced at two sides of the hollow space; front ends of the terminals being exposed in the hollow space and rear ends of the terminals being exposed out of the body. The body includes a first enclosure and a second enclosure; a plurality of connecting bars are extended from the first enclosure; and the second enclosure is formed with a plurality of connecting holes. An inner wall of each of the first enclosure and the second enclosure has a recess; as the first enclosure and the second enclosure are combined, the two recesses are formed as the hollow space. The hollow space has a rectangular shape or an elliptical shape. Each of the front ends is a rectangular discharging end, or a cambered discharging end or a tip discharging end.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
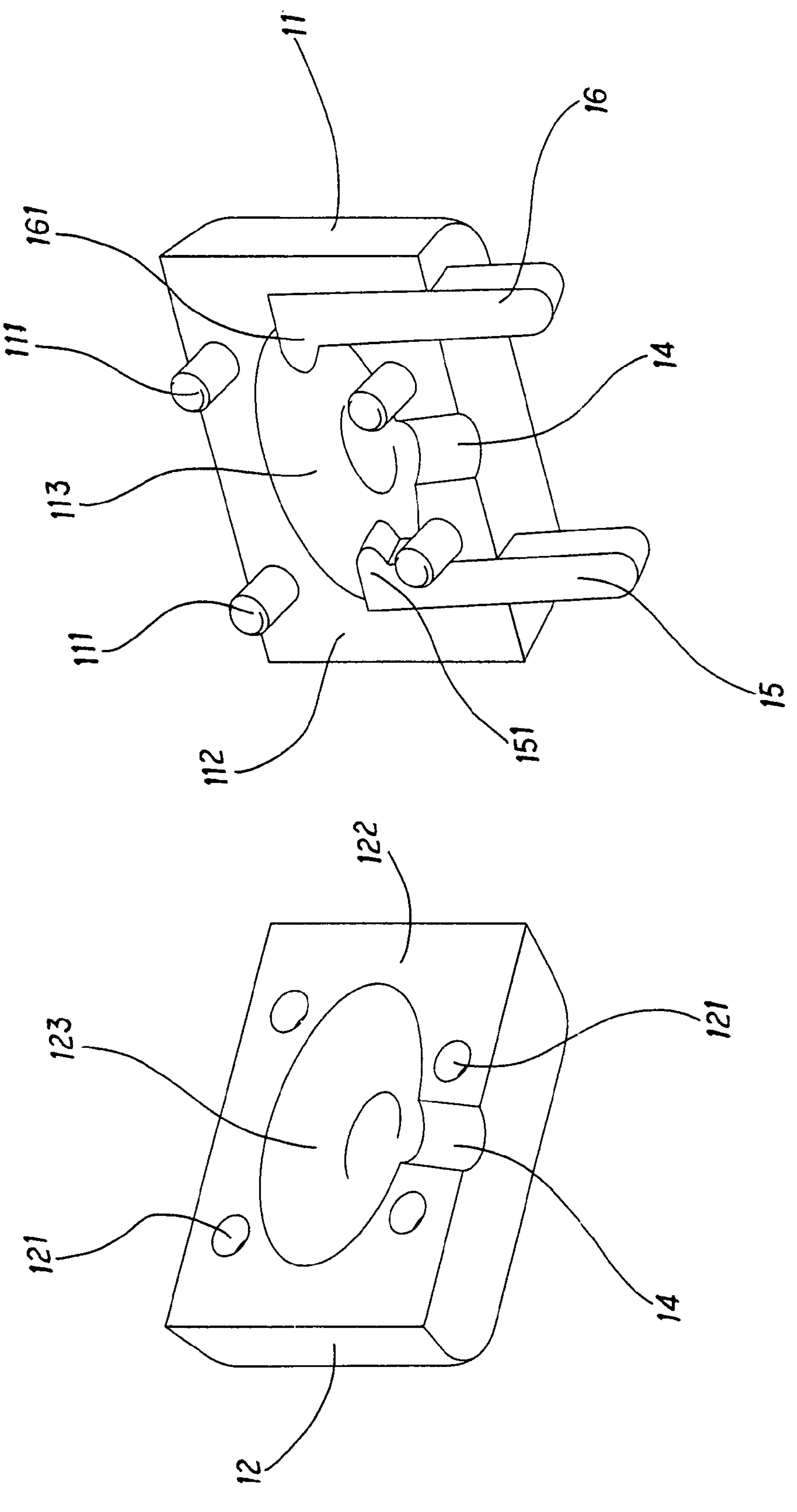
FIG. 1 is an exploded perspective view of the surge discharging device of the present invention.

Referring to FIG. 1, the surge discharging device of the present invention is illustrated. In this embodiment, the present invention has the following elements.

A first enclosure 11 is extended with at least one connecting bar 111. The first enclosure 11 has a wall 112. A recess 113 is formed in the wall 112.

A second enclosure 12 has at least one connecting hole 121 corresponding to the connecting bar 111. In this embodiment, there are four connecting bars 111 and four connecting holes 121. The second enclosure 12 has a wall 122. A recess 123 is formed in the wall 122. A hollow space 13 is formed by the recess 113 and recess 123 as the first enclosure 11 is combined with the second enclosure 12 (referring to FIG. 2A). There are various shapes suitable for the hollow space 13, preferably, the hollow space 13 has a round shape or a rectangular shape which is based on the rule of electric safety. It will be described hereinafter.

Figure 2:
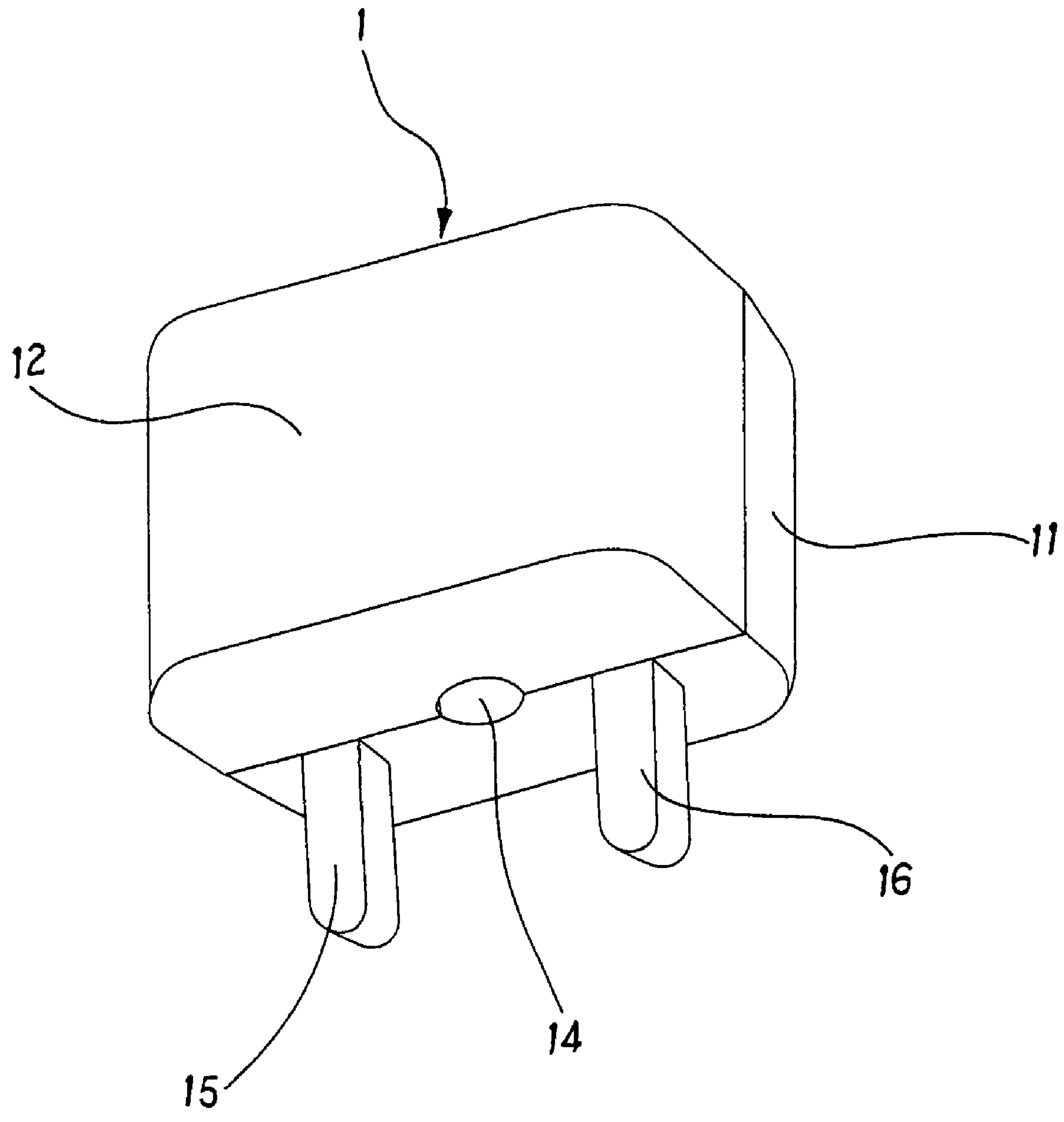
FIG. 2 is an assembled perspective view of the surge discharging device of the present invention.
Figure 2A:
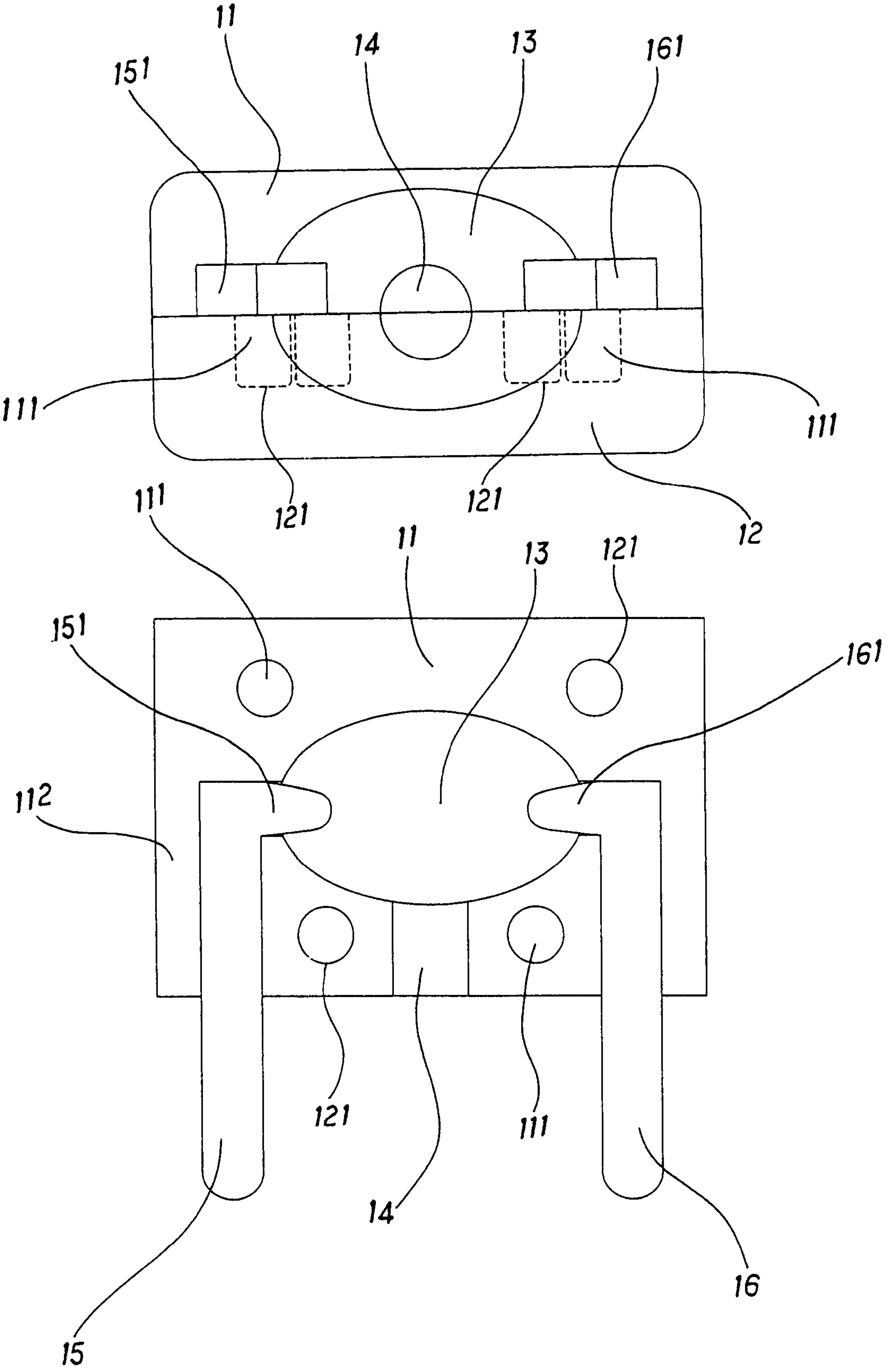
FIG. 2A shows the cross sectional view of the surge discharging device of the present invention.

Referring to FIG. 2, when the first enclosure 11 and second enclosure 12 are combined, a channel 14 is formed between the first enclosure 11 and the second enclosure 12. The channel 14 causes that the hollow space 13 can communicate with exterior through the channel 14.

Each of the two terminals 15, 16 has a part embedded in the first enclosure 11 and the other part extends downwards to be out of the first enclosure 11. Two tip ends of the front ends 151, 161 of the terminals 15, 16 are arranged at two sides of the hollow space 13 and are faced to one another. The hollow space 13 and channel 14 are formed as a discharging path for protecting a circuit from thunderbolt or electrostatic effect.

FIG. 2 shows the assembly view of the elements in FIG. 1. Thus the surge discharging device is formed as a small electric part. The terminals 15, 16 serve for being installed to a circuit substrate 3 (referring to FIG. 2) of such as a transformer, or a charging base of a handset.

Figure 3:
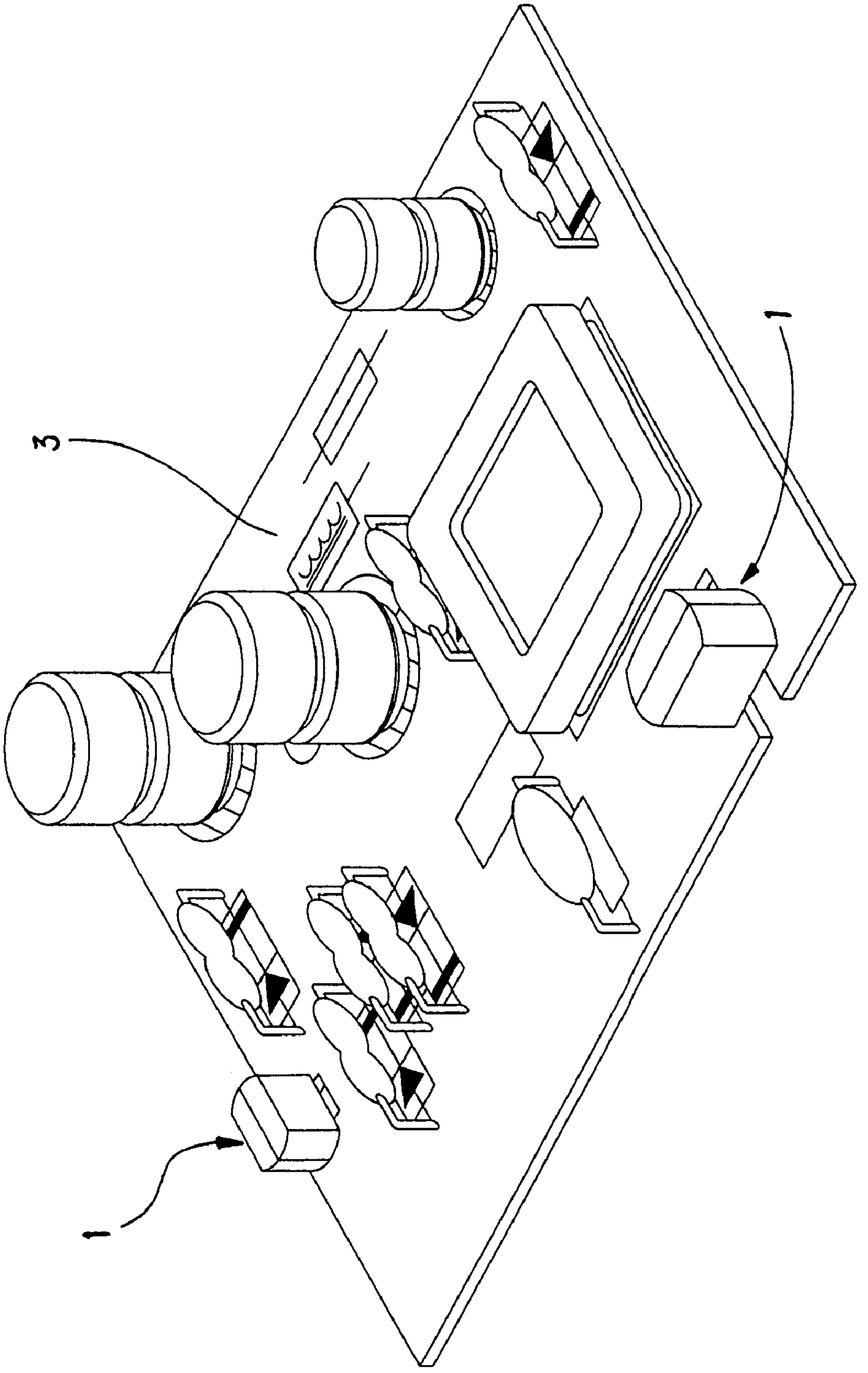
FIG. 3 is a schematic view showing that the surge discharging device of the present invention is applied to a circuit.

In the present invention, the surge discharging device is used to a circuit substrate for preventing surges. To enhance the protection of the electric device, the present invention is suitable to be installed to a primary end or secondary end of a transformer of a power input end. FIG. 3 shows that a circuit substrate of a transformer is installed with two surge discharging devices at the primary end and secondary end. In the safety rule, if the voltage in the primary end is 110V, at the primary end, the distance between the two terminals are 1.5 mm. At the secondary end, the distance between the two terminals are 2.0 mm. If the voltage in the primary end is 200V, at the primary end, the distance between the two terminals are 2.0 mm. At the secondary end, the distance between the two terminals is 4.0 mm.

Figure 4:
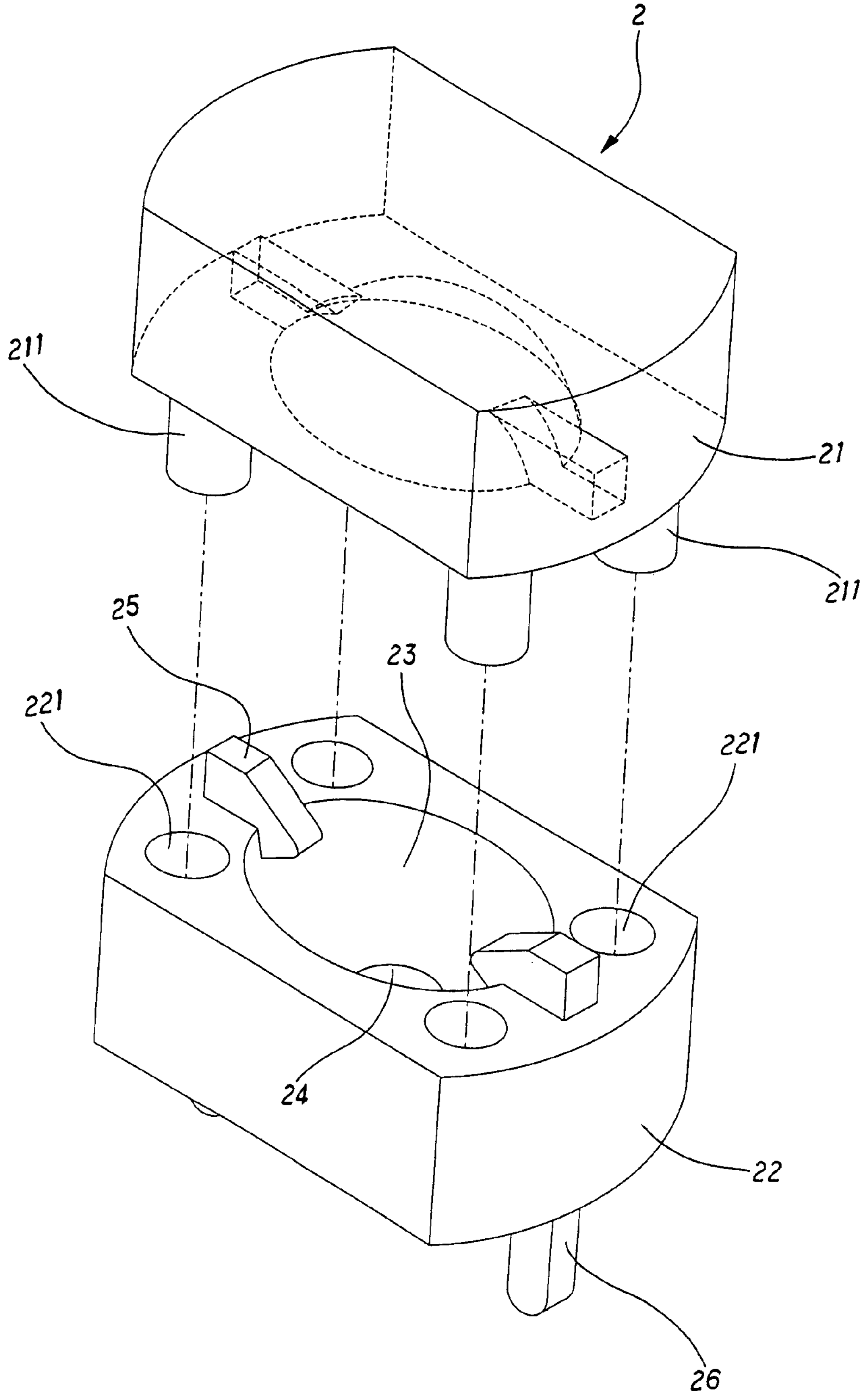
FIG. 4 shows another embodiment of the present invention.

FIG. 4 shows another embodiment of the present invention, similarly,

A first enclosure 21 is extended with at least one connecting bar 211. The first enclosure 21 has a wall. A recess is formed in the wall.

A second enclosure 22 has at least one connecting hole 221 corresponding to the connecting bar 211. In this embodiment, there are four connecting bars 211 and four connecting holes 221. The second enclosure 22 has a wall. A recess 23 is formed in the wall. A hollow space is formed by the recesses of the first enclosure 21 and the second enclosure 22 as the first enclosure 21 is combined with the second enclosure 22. There are various shapes suitable for the hollow space, preferably, the hollow space 13 has a round shape or a rectangular shape which is based on the rule of electric safety. It will be described hereinafter.

A channel 24 is formed in the lower side of the second enclosure 12. The channel 24 causes that the hollow space can communicate with exterior through the channel 24.

Figure 4A:
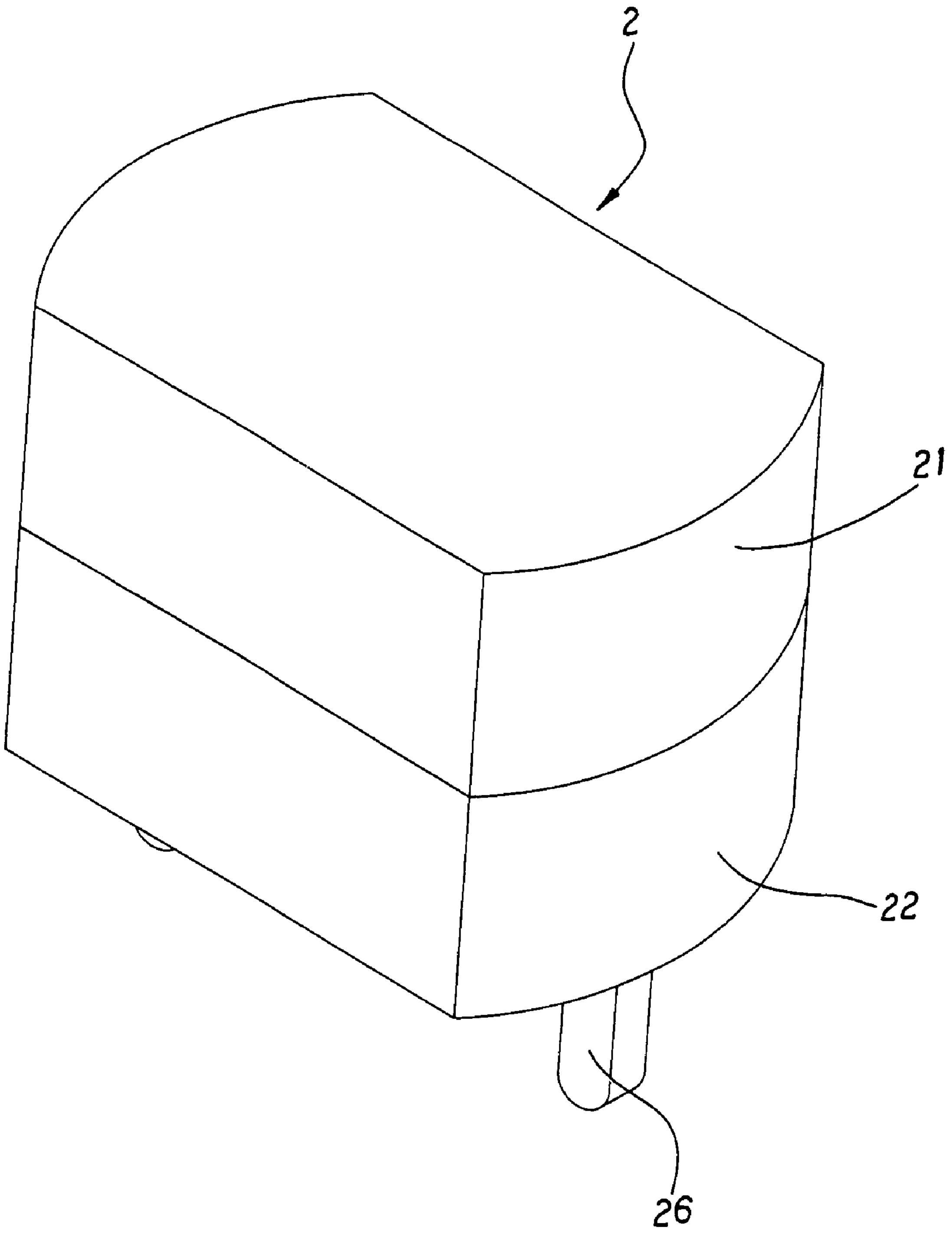
FIG. 4A is an assembled perspective view of a further embodiment of the present invention.
Figure 4B:
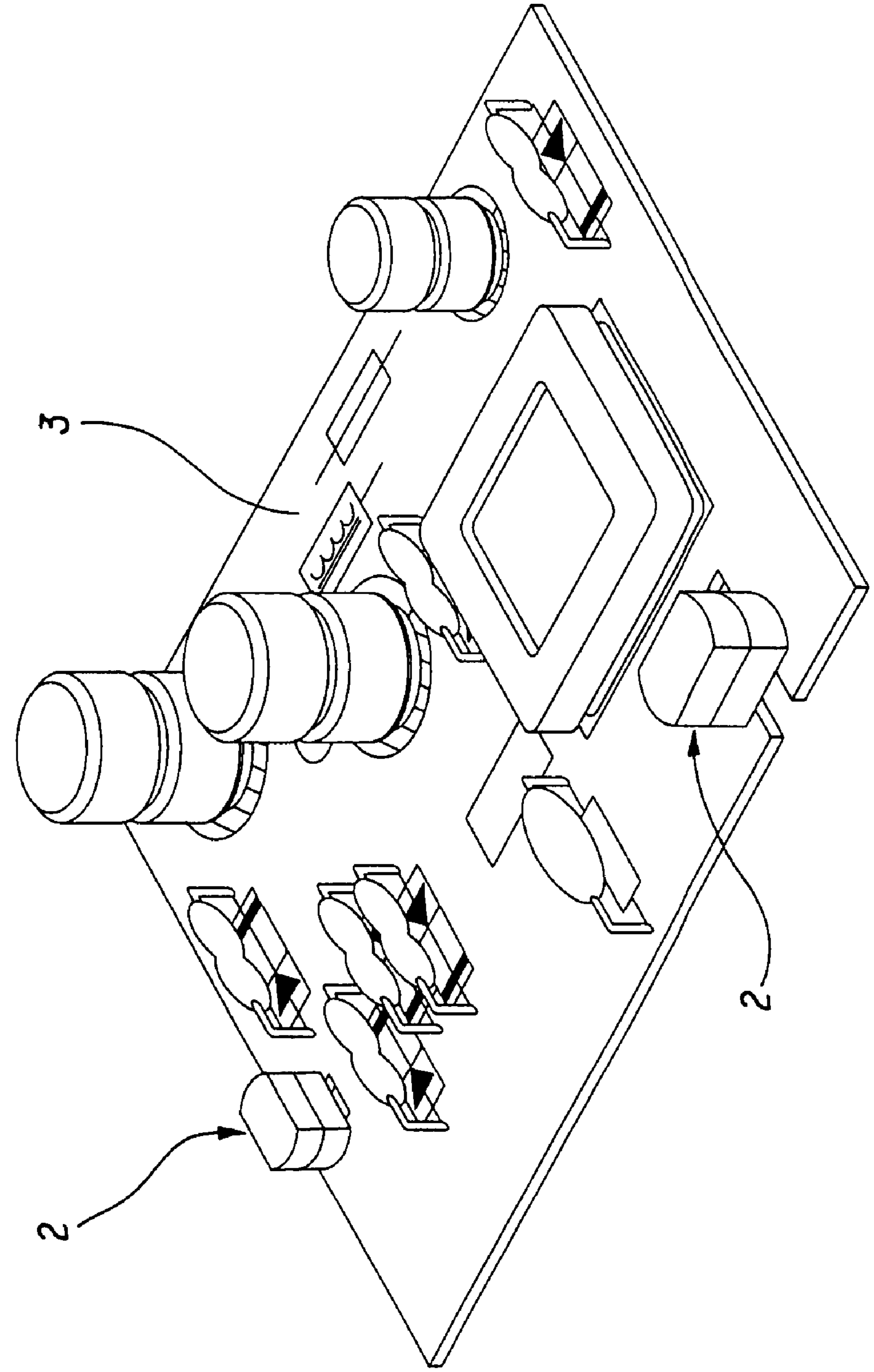
FIG. 4B shows the application of FIG. 4A.

Each of the two terminals 25, 26 has a part embedded in the second enclosure 22 and the other part extends out of the second enclosure 22. Two upper ends of the terminals 25, 26 are arranged at two sides of the hollow space 13 and are faced outwards. The hollow space 23 and channel 24 are formed as a discharging path. FIG. 4A shows the assembly of the first enclosure 21 and the second enclosure 22 and 4B shows that the present invention is used to a circuit substrate.

Figure 5:
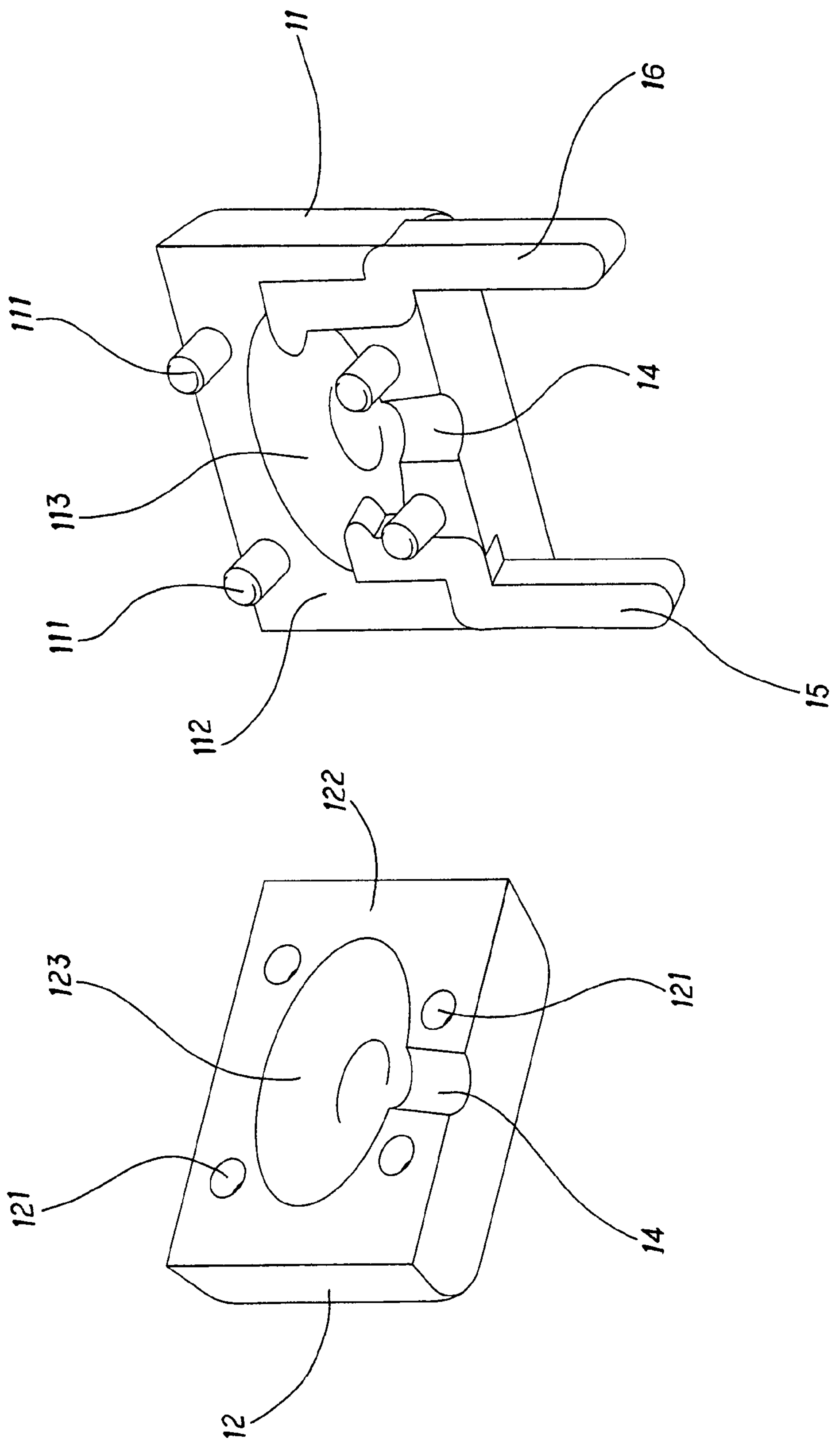
FIG. 5 shows a yet embodiment of the present invention.

FIG. 5 shows a further embodiment of the present invention. In this embodiment, those identical to the first embodiment will not be further described herein. Only those different from above embodiment are described. In this embodiment, the front ends 151, 161 of the terminals 15, 16 are bent so as to have a preferred positioning to the first enclosure 11 and second enclosure 12.

The principle of the present invention will be described herein. In a strong electric field, a surface with a great curvature, such as a tip end or an apex of a small object, has greater electric field, as a result, the air nearby will be ionized so as to discharge, this is so called corona discharge. Thus, as the surge discharging device of the present invention is applied to a circuit substrate, when a surge generates, charges accumulated in the circuit board will discharge with the front ends of the terminals and thus flow through the hollow space and channel.

Some embodiments of the present invention will be described hereinafter with reference to the appended drawings.

Figure 6:
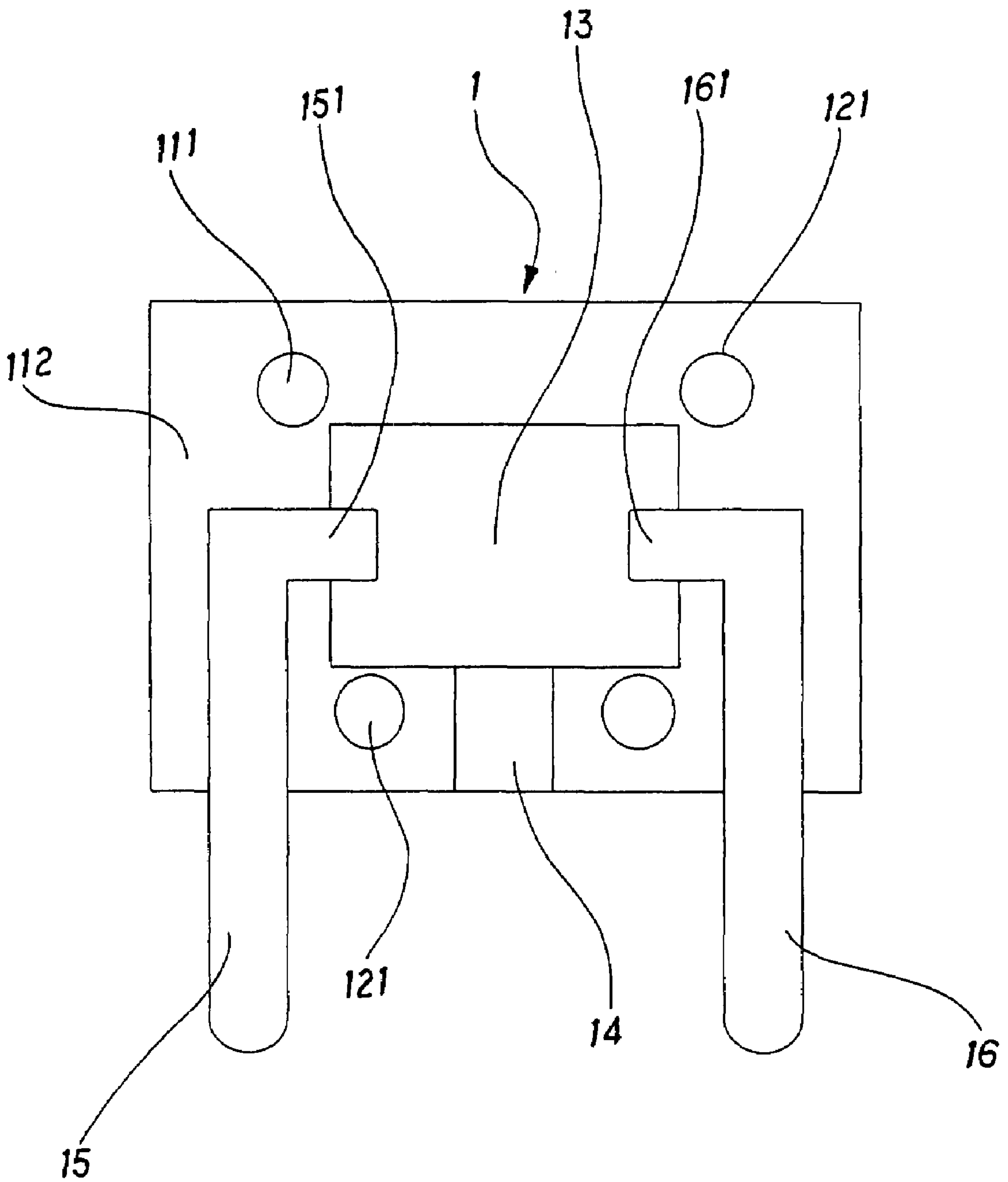
FIG. 6 shows a variation of the present invention, wherein the front ends of the terminals are changed.

Referring to FIG. 6, in this embodiment, those identical to the first embodiment will not be further described herein. Only those different from above embodiment are described. In FIG. 6, it is illustrated that the front ends 151, 161 of the terminals 15, 16 are bended from other portion and have a rectangular shape. The distance between the two terminals 15, 16 serve to control the voltage in discharging so as to be worked in different working mode. Thus each of the terminals 15, 16 has four tip edges at the front end so that more electrons can be discharged as surges occur. As a surge occurs, the air is ionized into positive ions and negative ions in the hollow space 13 and especially the space between the two terminals 15, 16 (which are now as electrodes). The insulating strength of the body 1 is very stronger than that of the air so that the ionized particles will form a discharging path through the hollow space 13 and the channel 14. Thus the high voltage and large current induced from the surge will be guided to the ground.

Figure 7:
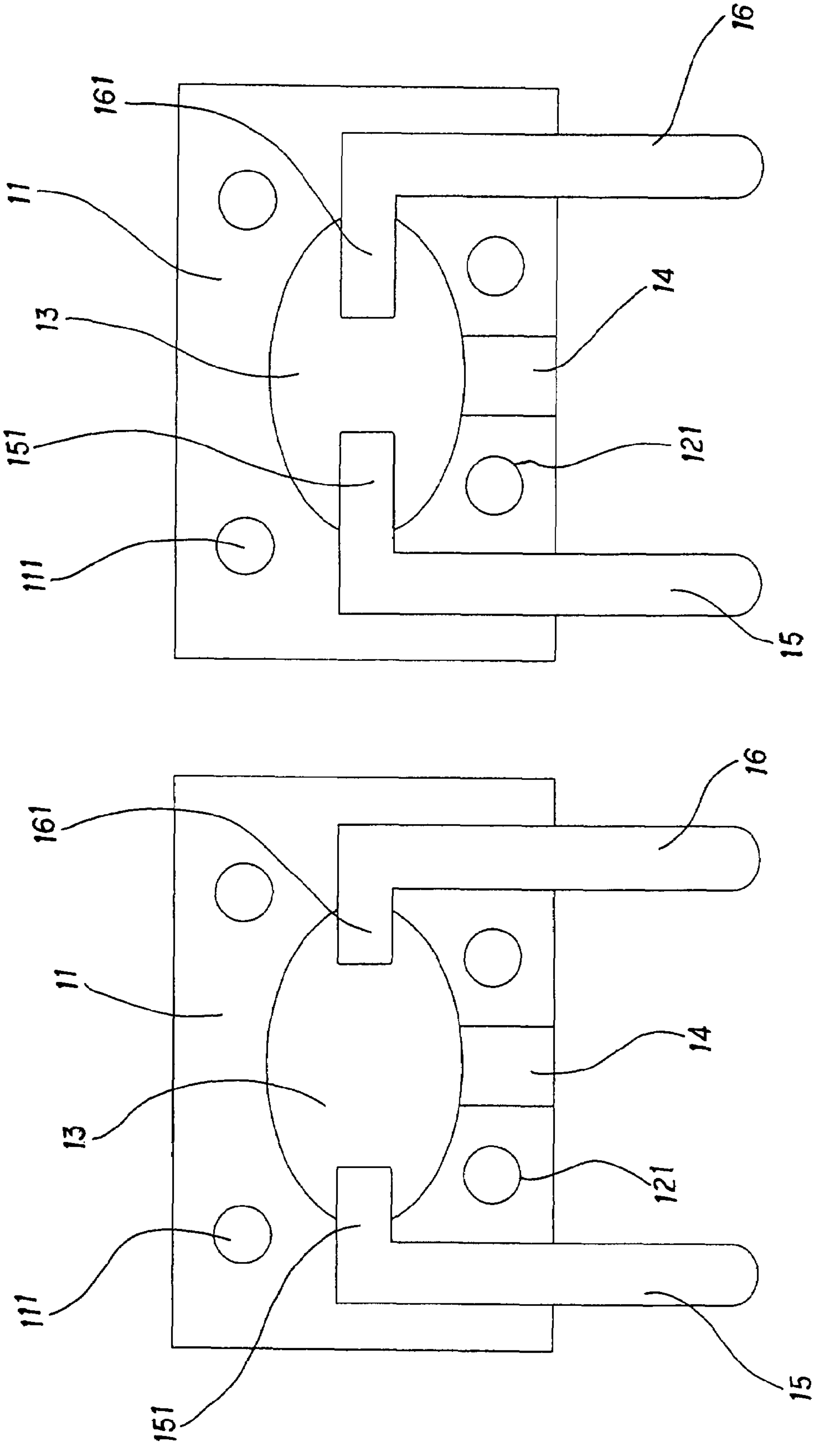
FIG. 7 is a schematic view showing another embodiment of the front ends of the terminals of the present invention.
Figure 8:
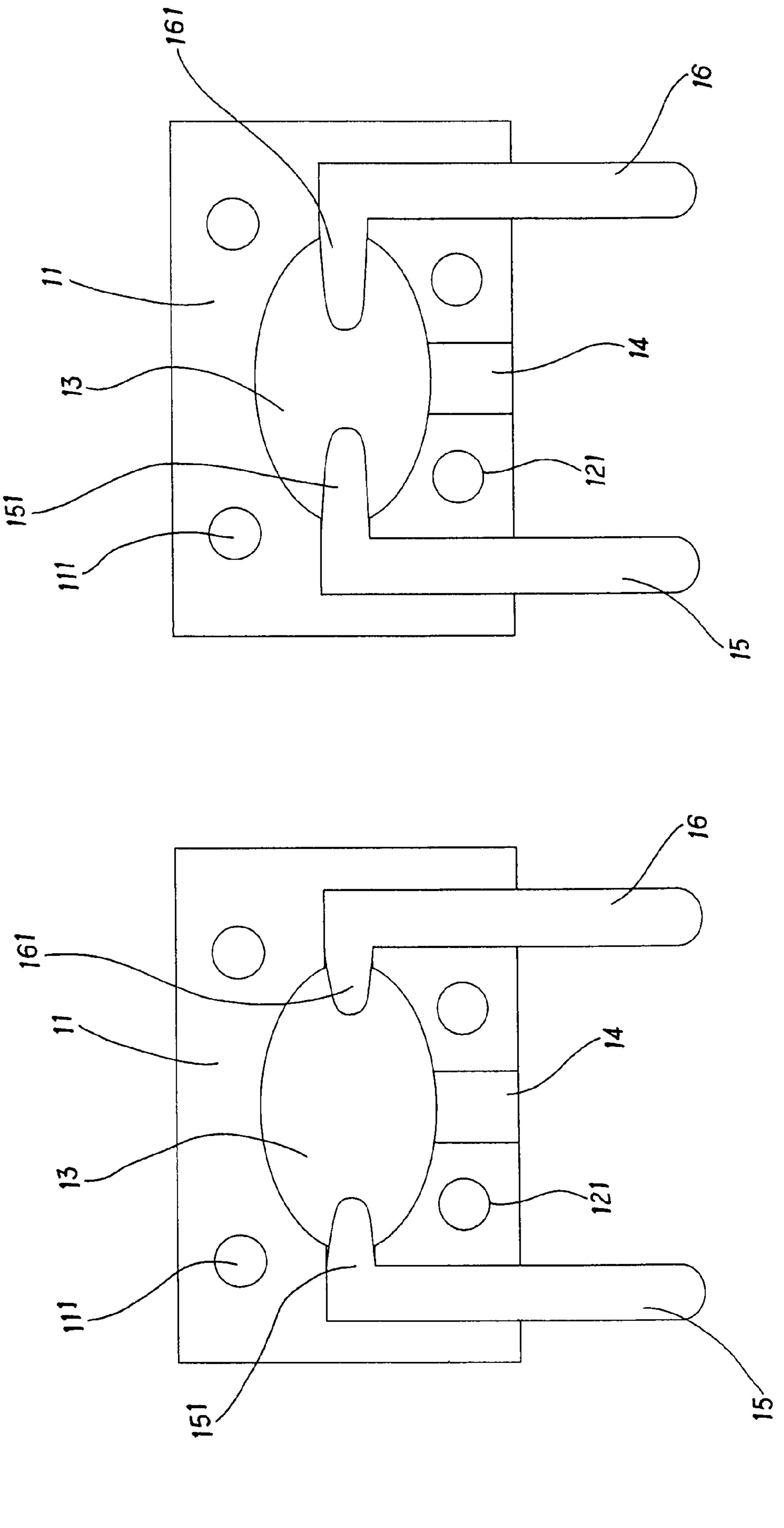
FIG. 8 is a schematic view showing a further embodiment of the front ends of the terminals of the present invention.
Figure 9:
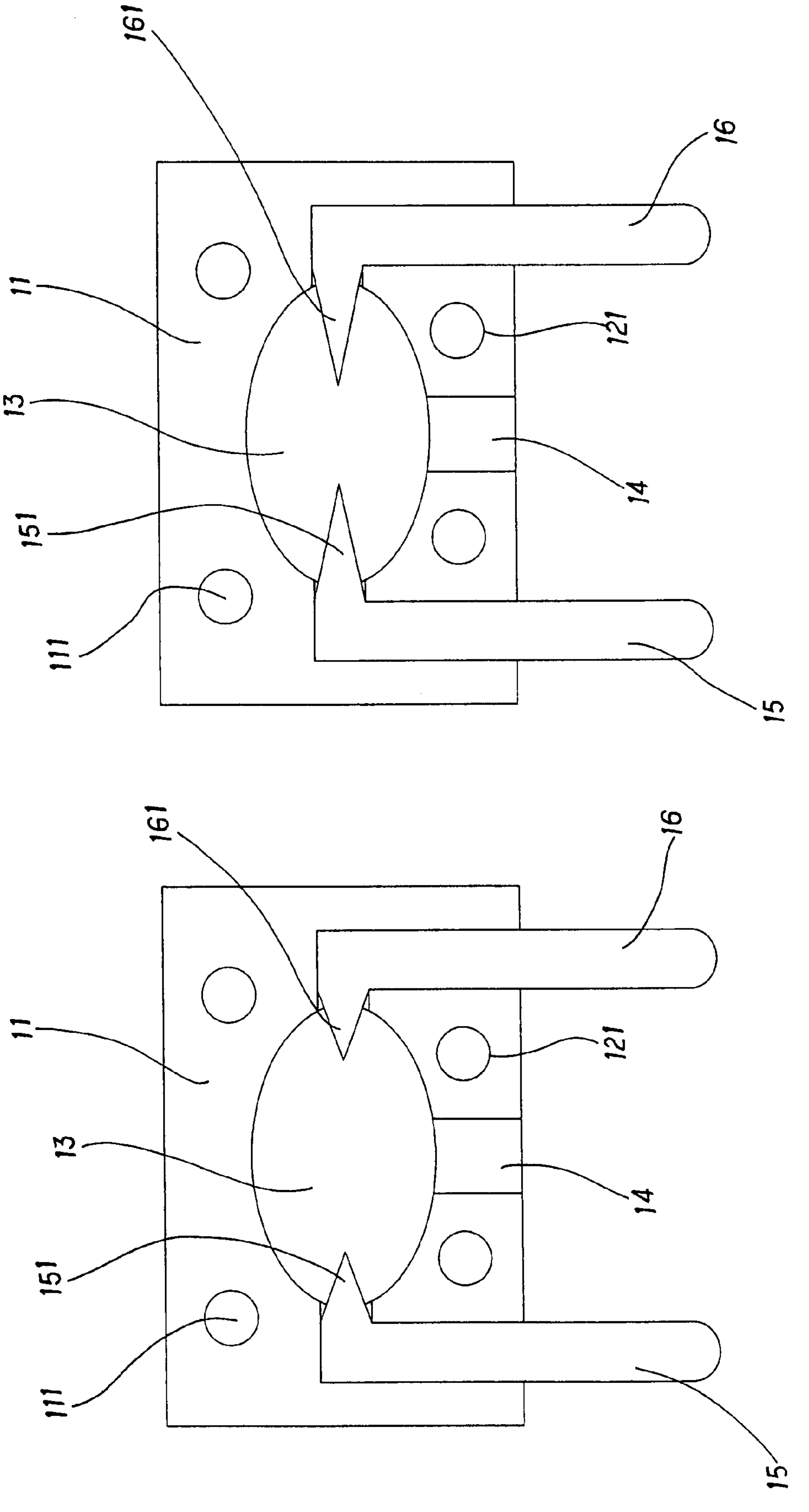
FIG. 9 is a schematic view showing a yet embodiment of the front ends of the terminals of the present invention.

Referring to FIGS. 7 and 9, another application of the present invention is illustrated. In this embodiment, those identical to the first embodiment will not be further described herein. Only those different from above embodiment are described. In the embodiments illustrated in FIGS. 7 to 9, the hollow space 13 is elliptical. In FIG. 7, the front ends 151, 161 of the terminals 15, 16 are bended from other portion and have a rectangular shape. In FIG. 8, the front ends 151, 161 of the terminals 15, 16 are bended from other portion and have a cambered shape. In FIG. 9, the front ends 151, 161 of the terminals 15, 16 are bended from other portion and have a tip shape. The distance between the two terminals 15, 16 serve to control the voltage in discharging so as to be worked in different working mode. Thus each of the terminals 15, 16 has four tip edges at the front end so that more electrons can be discharged as surges occur. As a surge occurs, the air is ionized into positive ions and negative ions in the hollow space 13 and especially the space between the two terminals 15, 16 (which are now as electrodes). The insulating strength of the body 1 is very stronger than that of the air so that the ionized particles will form a discharging path through the hollow space 13 and the channel 14. Thus the high voltage and large current induced from the surge will be guided to the ground.

In above embodiments, it is illustrated that the hollow space 13 may have a rectangular shape or an elliptical shape. Thereby the front ends 151, 161 of the terminals 15, 16 may be rectangular, cambered or tipped. However the main feature of the present invention is that the front ends 151, 161 of the terminals 15, 16 can induce the tip discharge so that air is ionized and thus the current is drained out through the hollow space 13, the channel 14 and to the exterior of the body 1. Thus the high voltage and current can be guided to the ground.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A surge discharging device for releasing electric surge due to high voltage of a circuit so as to avoid destruction of an electric apparatus having the device, the surge discharging device comprising:

a first enclosure (21) downwards extended with four connecting bars (211) from a lower surface of a wall thereof; an approximate half-elliptical upper recess being formed at in the lower surface; two opposite ends of the recess being formed with two straight trenches;

a second enclosure (22) has for connecting holes (221) corresponding to the connecting bars (211); the second enclosure (22) having a wall; an approximate half-elliptical lower recess being formed in the wall of the second enclosure; as the first enclosure (21) is combined with the second enclosure (22), a hollow space being formed by the recesses of the first enclosure (21) and the second enclosure (22);

a channel (24) being formed in the lower side of the lower recess of the second enclosure (22); the channel (24) causes that the hollow space can communicate with the exterior through the channel (24); and two terminals (25, 26), each of the two terminals (25, 26) having a part embedded in the lower recess of the second enclosure (22) and the other part extends out of the second enclosure (22); two upper ends of the terminals (25, 26) being arranged at two sides of the hollow space (13) and each having a front end faced toward the other; the two upper ends of the terminals (25, 26) being received in the two trenches extended from the two opposite ends of the upper recess; and the hollow space (23) and channel (24) being formed as a discharging path.

2. The surge discharging device as claimed in claim 1, wherein each of the front ends is a rectangular discharging end.

3. The surge discharging device as claimed in claim 1, wherein each of the front ends is a cambered discharging end.

4. The surge discharging device as claimed in claim 1, wherein each of the front ends is a tip discharging end.

* * * * *